United States Patent
Selén et al.

(10) Patent No.: US 9,883,324 B2
(45) Date of Patent: Jan. 30, 2018

(54) METHODS AND DEVICES FOR SENDING AND RECEIVING LOCATION INFORMATION FOR WIRELESS DEVICES

(75) Inventors: Yngve Selén, Uppsala (SE); Erik Dahlman, Bromma (SE); Stefan Parkvall, Stockholm (SE); Markus Ringström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 911 days.

(21) Appl. No.: 13/388,579

(22) PCT Filed: Dec. 20, 2011

(86) PCT No.: PCT/SE2011/051548
§ 371 (c)(1),
(2), (4) Date: Feb. 2, 2012

(87) PCT Pub. No.: WO2013/095220
PCT Pub. Date: Jun. 27, 2013

(65) Prior Publication Data
US 2013/0156190 A1    Jun. 20, 2013

(51) Int. Cl.
*H04W 4/00* (2009.01)
*G06F 21/60* (2013.01)
(Continued)

(52) U.S. Cl.
CPC .......... *H04W 4/008* (2013.01); *G06F 21/606* (2013.01); *H04L 5/0033* (2013.01);
(Continued)

(58) Field of Classification Search
CPC ..... G06F 21/602; G06F 21/606; H04L 9/006; H04L 9/007; H04L 63/0428–63/0492;
(Continued)

(56) References Cited

U.S. PATENT DOCUMENTS

2005/0273609 A1* 12/2005 Eronen .................... 713/171
2006/0256959 A1   11/2006 Hymes
(Continued)

FOREIGN PATENT DOCUMENTS

WO    2011063845 A1    6/2011

OTHER PUBLICATIONS

Corson, et al., "Toward Proximity-Aware Internetworking", The Internet of Things. IEEE Wireless Communications, Dec. 2010, 26-33.

*Primary Examiner* — Kevin Bechtel
(74) *Attorney, Agent, or Firm* — Murphy, Bilak & Homiller, PLLC

(57) ABSTRACT

The embodiments herein relate to a method in a first device (101) for informing a second device (105) that an identity associated with the first device (101) is at a certain location. The first device (101) obtains information about the location of the first device (101). The first device (101) broadcasts, by means of device to device, D2D, communication, a message to be received by the second device (105). The message comprises the location information and an identity information associated with a user of the first device (101). The location information is transmitted on a first communications resource and the identity information is transmitted on a second communications resource.

42 Claims, 9 Drawing Sheets

(51) Int. Cl.

| | |
|---|---|
| *H04L 29/06* | (2006.01) |
| *H04L 5/00* | (2006.01) |
| *H04W 4/02* | (2009.01) |
| *H04W 4/06* | (2009.01) |
| *H04W 4/20* | (2009.01) |
| *H04W 8/00* | (2009.01) |
| *H04W 84/18* | (2009.01) |

(52) U.S. Cl.
CPC ........... *H04L 63/0428* (2013.01); *H04W 4/02* (2013.01); *H04W 4/06* (2013.01); *H04W 4/20* (2013.01); *H04W 8/005* (2013.01); *H04W 84/18* (2013.01)

(58) Field of Classification Search
CPC .. H04L 5/003–5/0098; G08C 2200/00; H04W 4/008; H04W 4/02; H04W 4/06; H04W 4/20; H04W 8/005; H04W 84/18
USPC .................. 370/230.1, 436, 437; 713/150
See application file for complete search history.

(56) References Cited

U.S. PATENT DOCUMENTS

| | | | |
|---|---|---|---|
| 2008/0235384 A1* | 9/2008 | Meek ...................... H04L 67/16 709/229 |
| 2009/0019165 A1* | 1/2009 | Li et al. ......... 709/227 |
| 2013/0036166 A1* | 2/2013 | Dunko ................... H04L 51/20 709/204 |
| 2013/0036238 A1* | 2/2013 | Chowdhary et al. ......... 709/247 |

\* cited by examiner

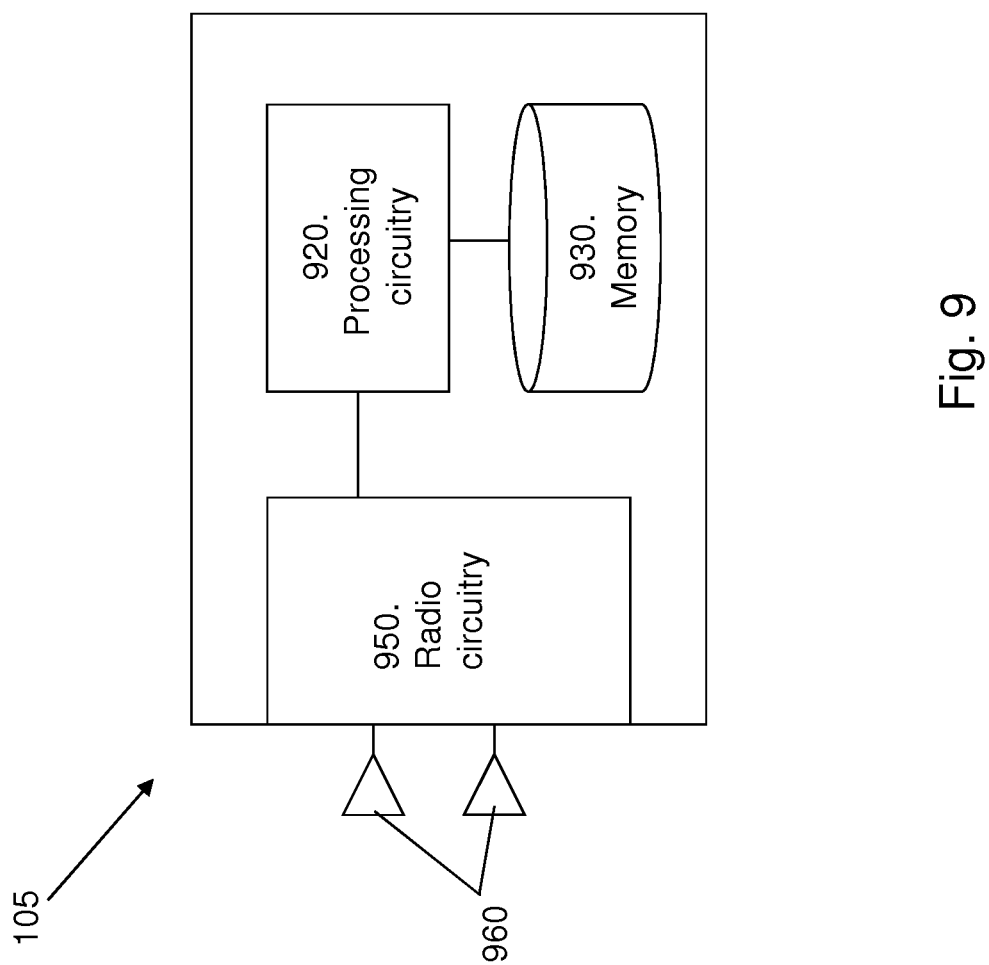

METHODS AND DEVICES FOR SENDING AND RECEIVING LOCATION INFORMATION FOR WIRELESS DEVICES

TECHNICAL FIELD

Embodiments herein relate generally to a first device, a method in the first device, a second device and a method in the second device. More particularly the embodiments herein relate to informing a second device that an identity associated with the first device is at a certain location.

BACKGROUND

Location aware and localized communication is becoming increasingly important. E.g., services such as Google Latitude, Facebook places etc, enable users to share their locations, and the services will adapt based upon where the users are located. The services used by the users will run on User Equipments (UEs). A user equipment is a mobile terminal by which a subscriber may access services offered by an operator. The user equipment may be for example communication devices such as mobile telephones, cellular telephones, smart phones, tablet computers, stationary computers or laptops with wireless capability. The user equipments may be portable, pocket-storable, hand-held, computer-comprised or vehicle-mounted mobile devices, enabled to communicate voice and/or data with another entity, such as another user equipment, a server or any other node in a system.

For example, two users, each having a user equipment, may want to be notified when they are in close proximity to one another. This type of services will likely gain importance in the future, e.g., in social media and augmented reality applications. Further, besides the social media applications, a multitude of use cases for the proximal Internet where the user interacts directly with its surroundings can be imagined.

Device-to-device communication (D2D) is a concept describing that devices, typically user equipment's, communicate directly with each other. Direct communication is here interpreted as communication without any intermediate infrastructure. A prerequisite for D2D communication is that the communicating devices are proximate devices which are aware of each other's physical presence. The D2D communication between devices can be efficient in terms of communication resource usage, energy and bandwidth since the communication does not go via any intermediate infrastructure. D2D communication uses dedicated communication resources or any suitable communications resource which is available in a system. One reason for using the D2D communication is to increase the efficiency relating to energy, bit rate, and Quality of Service (QoS) of systems.

In some examples of D2D communication, devices periodically transmit signals carrying an identity. The identity may also be referred to as an expression. An identity may depend on a certain user or owner of the user equipment, a place, an application, etc. For example, the identity may be tied to a certain group of users on a social media application, such as Facebook, and then identifies a particular user to other members of this user group. In other words, each member of the user group which receives the identity will be able to identify that the user transmitting the identity is nearby. This type of identities are typically private, i.e., only interpretable to an intended group of users. Identities may also be public and carried by shops, restaurants, buses, taxis, museums, etc. This type of identities may be understood by anyone. The identities may be transmitted to a specific receiver, or it may be broadcast in the system. As mentioned above, the system refers to a plurality of user equipment's which understands the identities.

The identification of the identities tells listening and authorized users that the transmitter of the identity is nearby. The transmitter of the identity may be for example a device, a building, a service, etc.

SUMMARY

An object of embodiments herein is therefore to provide improved device to device communication.

According to a first aspect, the object is achieved by a method in a first device for informing a second device that an identity associated with the first device is at a certain location. The first device obtains information about the location of the first device. The first device broadcasts, by means of device to device, D2D, communication, a message to be received by the second device. The message comprises the location information and an identity information associated with a user of the first device. The location information is transmitted on a first communications resource and the identity information is transmitted on a second communications resource.

According to a second aspect, the object is achieved by a method in a second device for being informed by a first device that an identity associated with the first device is at a certain location. The second device receives, by means of device to device, D2D, communication, a message broadcast from the first device, wherein the message comprises the location information and an identity information associated with a user of the first device. The location information is received on a first communications resource and the identity information is received on a second communications resource.

According to a third aspect, the object is achieved by a first device for informing a second device that an identity associated with the first device is at a certain location. The first device comprises an obtaining unit which is configured to obtain information about the location of the first device. The first device comprises a broadcasting unit configured to broadcast by means of device to device, D2D, communication, a message to be received by the second device. The message comprises the location information and an identity information associated with a user of the first device. The location information is transmitted on a first communications resource and the user identity is transmitted on a second communications resource.

According to a fourth aspect, the object is achieved by a second device for being informed by a first device that an identity associated with the first device is at a certain location. The second device comprises a receiving unit which is configured to receive a message broadcast, by means of device to device, D2D, communication, from the first device. The message comprises location information and an identity information associated with a user of the first device. The location information is received on a first communications resource and the user identity is received on a second communications resource.

Since the message comprises both the location information and the identity information associated with the user of the first device, device to device communication is improved.

Embodiments herein afford many advantages, of which a non-exhaustive list of examples follows:

An advantage of the embodiments herein is that the first device transmits the message in an efficient manner and the message is decoded by any or only authorized receivers, i.e. second devices. This enables software on the second device to exploit the location information.

As the location information may be truncated, it provides the advantage of reducing the amount of utilized communication resources in the communication link between the first device and the second device.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 9 is a block diagram illustrating embodiments of a second device.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein describe ways of augmenting identity information with location information in a message. Location information may also be referred to as position information. It should be noted that this location information may typically be heavily truncated since the receiver of the message will typically be within short distance, e.g., a few 100 s of meters, from the transmitter of the message and often much closer, due to the limitation set by the physical link between the transmitter and the receiver. It is assumed that the receiver of the message has approximate information of its own location.

The embodiments herein comprise the following aspects:
1) Augment identity information with location information in a message.
2) Truncate the location information.

In many instances it would be desirable to extend the identity information with location information of the transmitter of the message if this is known to the message transmitter. The receivers of the message would then be able to know both that the transmitter of the message is nearby and also its more detailed location.

Figure 1:
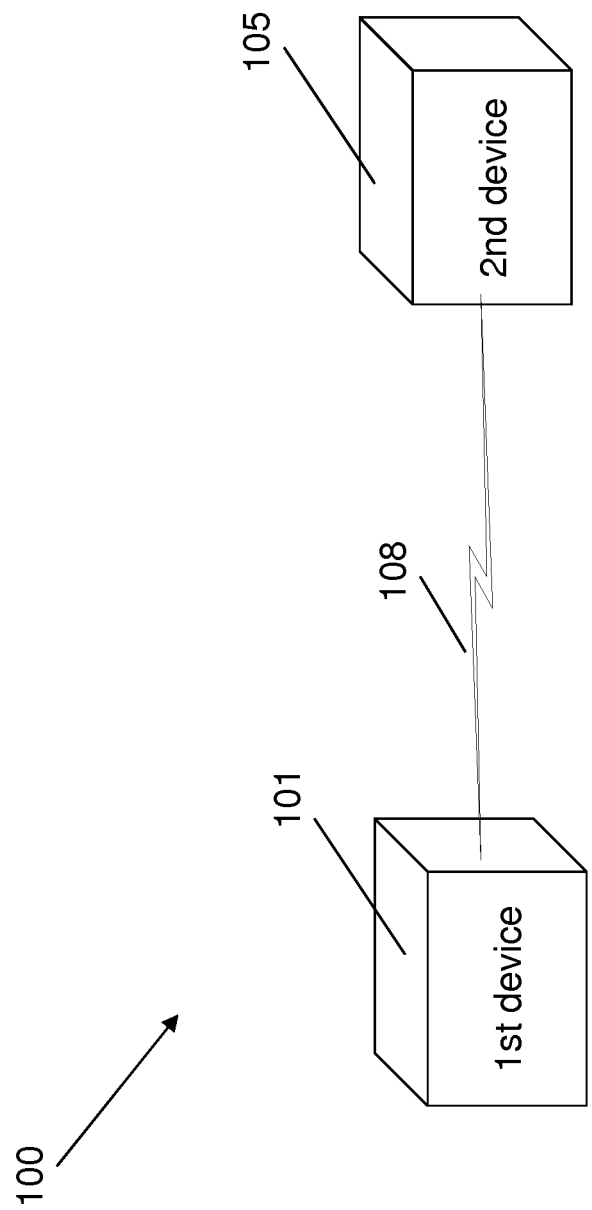
FIG. 1 is a schematic drawing illustrating embodiments of a system.

FIG. 1 depicts a system 100 in which embodiments herein may be implemented. The system 100 comprises a first device 101 which is in D2D communication with a second device 105. The first device 101 may be a user equipment such as a mobile phone, smart phone, personal digital assistant (PDA), tablet computer, laptop, MP3 player, portable DVD player, digital camera, or even stationary devices such as a PC, it may be an embedded communication device in e.g. electronic photo frames, cardiac surveillance equipment, intrusion or other surveillance equipment, weather data monitoring systems, vehicle, car or transport communication equipment, it may be any type of transmitter connected to e.g. a bus, a bus stop, a shop, a public place, a movie theater etc. Basically, the first device 101 may be any type of device which has an interest of announcing "hey, I'm here". The second device 105 may be a user equipment such as a mobile phone, smart phone, personal digital assistant (PDA), tablet computer, laptop, MP3 player, portable DVD player, digital camera, or even stationary devices such as a PC, it may be an embedded communication device in e.g. electronic photo frames, cardiac surveillance equipment, intrusion or other surveillance equipment, weather data monitoring systems, vehicle, car or transport communication equipment, etc.

The first device 101 communicates with the second device 105 over a wireless communication link 108. The communication link 108 may be based on any suitable wireless communication protocols such as for example WiFi, ZigBee, Wireless Universal Serial Bus (WUSB), Bluetooth, FlashLinQ, future versions of Universal Terrestrial Radio Access Network (UTRAN) or Evolved-Universal Mobile Telecommunications System Terrestrial Radio Access (E-UTRA).

The method for informing the second device 105 that an identity associated with the first device 101 is at a certain location, according to some embodiments will now be described with reference to the combined signaling diagram and flowchart depicted in FIG. 2. More specifically, the method is for informing the second device 105 that a bearer of the identity information is at the location. It may also be formulated as for informing the second device 105 on what identities and associated locations associated with the first device 101 are present where in the vicinity of the second device 105. The first device 101 is configured to broadcast messages to be received by device(s) which are nearby, i.e. the first device 101 and the second device 105 are in proximity or in the vicinity of each other. This message comprises information about an identity associated with the user/owner of the first device 101 at a certain location. The identify information provides the receiver of the message, i.e. the second device 105, with information about the transmitter, i.e. the first device 101, being near its own location, for example within a few 100 meters. The term broadcast refers to a method of transferring a message to all devices in the system. The user of the first device 101 may be for example a person, a shop or a restaurant, or any of the examples mentioned earlier. The first device 101 may have one or more identities to transmit.

The method comprises the following steps, which steps may as well be carried out in another suitable order than described below.

Step 201

The first device 101 determines if its location information should be comprised in the message or not.

The addition of location information in the message requires more communication resources, i.e. it involves additional load on the system, albeit typically not very high. The load in the system relates to the amount of transmitted data and is measured in for example spectrum resource utilization, i.e. how large quantity of the available spectrum is used for transmitting the data. The same amount of communication resources is available but more data needs to be transmitted in the broadcasting of the message comprising location information. Thus, the load of the system may be a parameter which decides whether appending location information to certain messages is allowed or recommended. For example, if the fraction of the available communication resource used (e.g., without taking the additional load by appending the location information into account) is above a certain threshold or percentage, then the location information would not be appended to the message. The threshold and percentage may be a predefined parameter in the first device 101. In order to get a stable system, the fraction of the available communication resource should disregard the appended location information and only compute the fraction of the available communication resource which is used for carrying the identity information. Time averaging or some other averaging method may also be employed.

In addition, the first device 101 may not always know its own location, or may for some reason not wish to share its location. Then the first device 101 determines that it should not append location information to the message. If the first device 101 determines that location information should not be comprised in the message, the method proceeds to step 206, indicated by "no" in FIG. 2.

Figure 2:
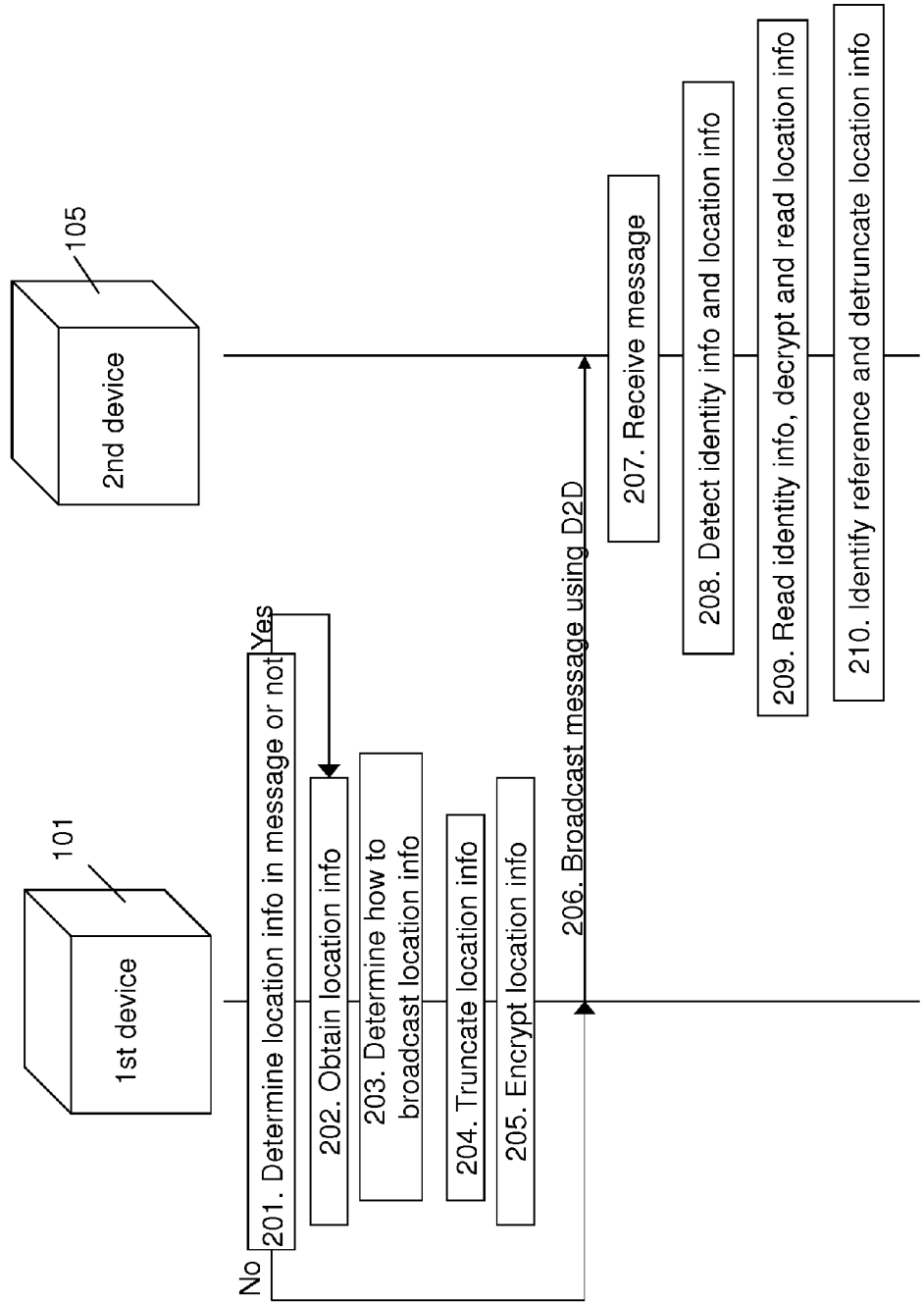
FIG. 2 is a combined flow chart and block diagram illustrating embodiments of a method.

If the first device 101 determines that location information should be comprised in the message, the method proceeds to step 202, indicated by "yes" in FIG. 2.

Step 202

When the first device 101 has determined that the location information should be comprised in the broadcast message together with the associated identity information in step 201, indicated as "yes" in FIG. 2, the first device 101 obtains its location.

The location is the geographic location or position of the first device 101. The location needs to be given relative to a reference coordinate system known to the second device 105. Several references are possible, such as for example the Global Positioning System (GPS) coordinates, Global Navigation Satellite System (GLONAS), the global navigation satellite system called Galileo or a local coordinate systems such as the Rikets Nät (RT90) used in Sweden. For example, the location of the first device 101 is given using GPS as the reference coordinate system, and may be 57.708611, 11.973056.

The location information may be predefined in the first device 101, or obtained at regular intervals by receiving the location information from e.g. GPS satellites. If the first device 101 is stationary, the location information may be predefined. In another example, where the first device 101 is moving, the location information may be obtained at regular intervals.

The obtained location information is non-truncated, i.e. having full precision.

Step 203

The first device 101 determines in which way it shall broadcast the message comprising the obtained location and the associated identity information, i.e. in which way the available communication resources should be utilized to broadcast the message.

There are many possible ways by which the first device 101 could broadcast the message. The following parameters are used below:

location_resource: the spectrum resource which is used to broadcast the location information comprised in the message; e.g., an area in a time-frequency grid, a code, a time slot, etc.

identity_resource: the spectrum resource which is used to broadcast the identity information comprised in the message; e.g., an area in a time-frequency grid, a code, a time slot, etc.

identity_value: a numerical value of the message which identifies the user of the first device 101 transmitting the message. The user of the first device 101 may be for example a certain user in a certain context, such as a social network user group, or the user may be a vehicle, a store, a bus stop, a public library etc. which also may possibly be in the context of a social network or other type of network, etc.

The message comprises both the location_resource and the identity_resource. The location information may be comprised in the message using a fixed location dedicated resource, referred to as a first communications resource, based on the identity value. One example is to calculate a hash function using the identity_value as input. A hash function is a function that maps large data sets to smaller data sets. The result of the hash function maps the location information obtained in step 202 to the dedicated communication resource, e.g., a location in a time-frequency grid, which may be identified based on the value of the identity itself. Different identity_values may give the same location_resource. In other words, a mapping such as:

location_resource=hash_function(identity_value).

The candidates for location_resource, i.e. possible mappings from hash_function(.), may be either shared with the regular communications resources used for broadcast of the message, they may be a set of communication resources dedicated for location information, or they may be communication resources that are not dedicated for messages but which may be used for other purposes, e.g., transmission of data between the first device 101 and the second device 105. These settings may be based on parameters such as e.g. the system load.

Another example is to comprise the communication resource at which the identity information is broadcast in the hash function, or possibly only use the identity_resource:

location_resource=hash_function(identity_value, identity_resource)

or location_resource=hash_function(identity_resource).

The identity_resource may have some degree of randomness, which implies that this mapping should avoid successive overlaps of the location resource between two messages, and different messages will not end up mapping their location information to the same communication resource, which means that they will not interfere.

In another example, the location information in the message may be broadcast directly in the identity_resource. This may be done by allocating a large enough identity_resource for all messages, i.e., in some sense over-allocating resources for the messages which do not comprise any identity information.

Another example is to set aside a fraction of the potential values for identity_value and for those allocate a lower number of bits for the identity information. For example, if identity_resource may carry n bits, some identity information or instances of identity_value will use n-x bits and use the remaining x bits for the location information. A prerequisite for this is that it must be decided beforehand if message may comprise location information and also reserve a bit sequence of x bits for "location not known or shared". This does not cause any overhead for messages which do not comprise location information.

The identity information is mapped to a second communications resource.

The first communications resource and the second communications resource may be different communications resources. Separating the identity information and location information in separate communication resources provides a possibility to add the embodiments herein to existing systems which is currently only designed for transmitting identity information. Furthermore, it provides a flexible solution in situations where some devices want to send location information and other devices do not want to send location information.

In some embodiments, the first communications resource and the second communications resource may be the same communication resources. A set of all possible identities associated with the first device 101 may be set aside and fewer bits are allocated for the identity information. The other bits, i.e. the freed up bits, are allocated for the location information. The information sent on the second communication resource may have a bit which is reserved for indicating whether location information is comprised in the message or not. This bit is detectable by the second device 105.

Step 204

The first device 101 truncates the obtained location information.

Though it would be possible to include the full location coordinates for a location, the amount of data may be very large and to a large extent unnecessary since the location is already known within e.g. hundreds of meters due to that the range of D2D communication is limited to a few hundred meters. It is assumed that the second device 105 knows its own location e.g. via GPS or any other positioning method. One way to circumvent this is to truncate the data. There are several possibilities to do this. One way is to include a predefined set of decimals of the GPS (or similar) coordinates. If for example decimals 3-5 are included a location with approximately one meter precision is possible within an area with approximately a 1000 meter side. Another way is to define a local grid with a predefined relation to the reference coordinate system, e.g. by defining an origin at every whole 1000 meter in the reference coordinate system. Yet another way is to give the location relative to e.g. every whole 1000 meter in the reference coordinate system. For example, the first device 101 says "relative to my closest grid point, this is my location". The second device 105 who may hear the first device 101 knows that it is near its own location and may uniquely identify the referred grid point. The number of bits needed for a given precision is discussed later.

Since proximal information is considered, as described in the introduction to FIG. 2, the receiver of the message will know that the transmitter is near its own location, say within a few 100 meters. In this example, the second device 105 will know that the first device 101 is near its own location. This means that the location information may be heavily truncated before being broadcast. By assuming a square grid of possible location points, the number of bits in the truncated location information may be computed in the following way:

$$nrof\_bits = ceil(log\ 2((floor(2*max\_distance/precision))^2))$$

max_distance is the maximum distance between the message transmitter, i.e. the first device 101, and the receiver, i.e. the second device 105, at which one expects that the receiver may successfully decode the message. precision is a spacing between points in a square grid. ceil is a function which maps a real number to the smallest following integer, and floor is a function which maps a real number to the largest previous integer. Log 2 is a binary logarithm. A real number is a number that represents a quantity along a continuum, and it may be real number may be either rational or irrational, algebraic or transcendental and either positive, negative, or zero.

For some exemplary values, using max_distance=1000 meters and precision=3 meters in the above equation, the nrof_bits becomes 19. If precision=10 meters the nrof_bits becomes 16. The number of bits for carrying the identify information, referred to as identify_value above, may be, e.g., 64 bits or 128 bits. The nrof_bits for truncated location information is thus typically significantly less than the number of bits which are discussed in the context for carrying the identity information, so the overhead of appending the location information is comparatively low.

Figure 3:
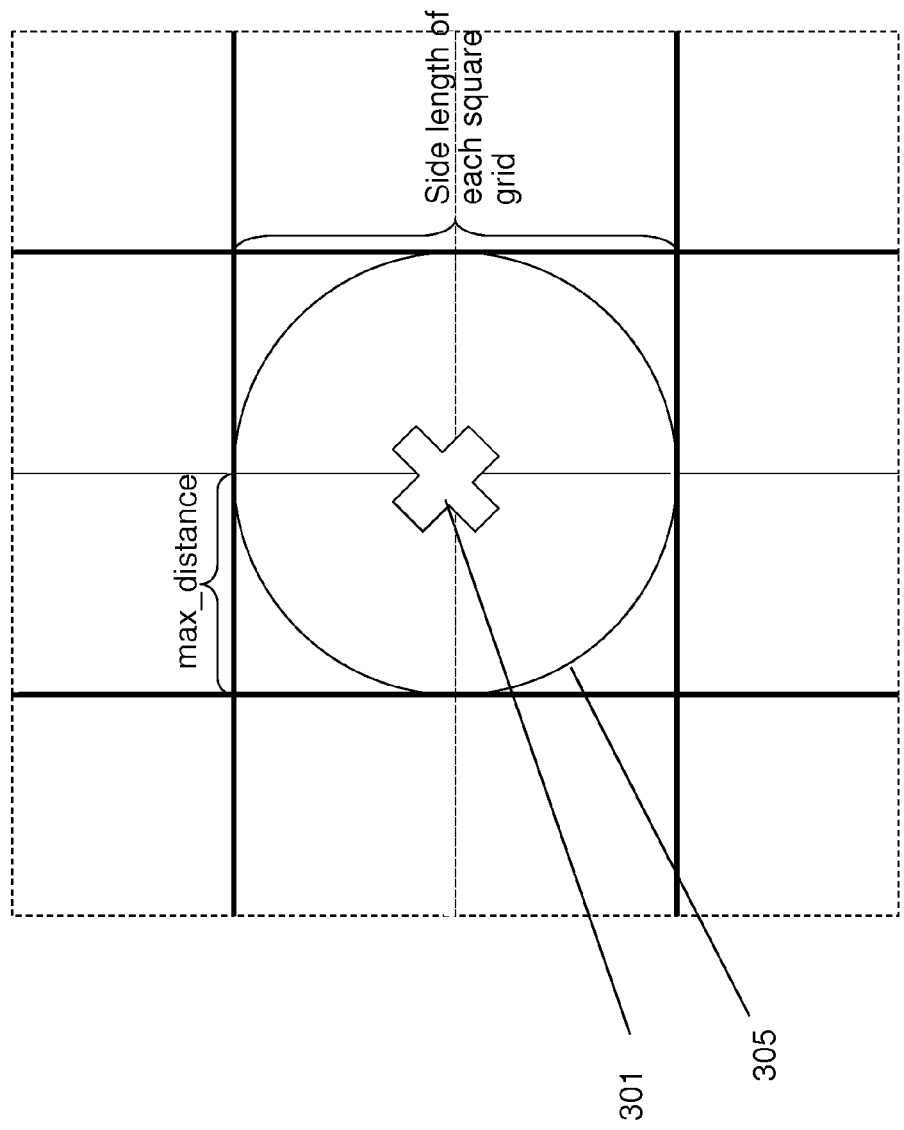
FIG. 3 is a square grid illustrating embodiments of a method for obtaining location.

The truncation of the location information of a first device 101 may be obtained by combining the information of the first device's 101 own location with the knowledge of the precision of location points of a square grid. FIG. 3 illustrates the square grid. Each square delimited by bold lines comprises gridpoints. In the case of a square grid, the grid comprises floor(2*max_distance/precision))^2 number of gridpoints. One of the gridpoints uniquely determines the location of the transmitter of the message. The x-mark 301 in FIG. 3 illustrates a possible location of the second device 105 listening to messages.

Note that the curvature of the surface of the Earth 305 is low enough so that the local approximation of the surface as a square is rather precise. These squares will in reality be slightly overlapping. Also note that the grid need not be made of squares nor may the gridpoints be points on a square grid. Other geometries, such as hexagons may be used. Further, height information may be comprised such that the grid would be in three dimensions (3D).

Step 205

If the message is intended to only be understood by authorized receivers, the first device 101 encrypts the location information using an encryption key. The second device 105 has at some earlier point in time been provided with a decryption key corresponding to the encryption key. The first device 101 or a third party may have provided the second device 105 with the decryption key. This would typically be done only for a non-public message. If the message is a public message, this step is not performed. This way, the message may be understood by both authorized and non-authorized second devices 105.

Step 206

The first device 101 broadcasts, by means of D2D communication, the message to be received by the second device 105. The message comprises the location and the identity information associated with the user of the first device 101.

The first device 101 typically broadcasts the message at regular intervals, e.g. every 6 seconds.

Since the message is broadcast using D2D communication, the messages may only reach/travel a certain distance.

As mentioned above, step 206 may be performed directly after step 201 when the first device 101 has determined that location information should not be comprised in the message. Step 206 may also be performed directly after step 205. In that case, the first device 101 determined in step 201 that the location information should be comprised in the message together with the identity information.

Step 207

The second device 105, which is nearby the first device 101, listens for messages and receives the broadcast message. The second device 105 is configured to listen to D2D messages.

As the message is broadcast using D2D, the second device 105 which receives the message, thereby implicitly knows that the first device 101 is close. This is because D2D communication is distance limited. For example, if the D2D communication is based on Bluetooth the distance may range up to 50 meters. In another example where the D2D communication is based on WiFi the distance range up to 32 meters in indoor locations and up to 95 meters in outdoor locations.

Step 208

The second device 105 detects, in the message, the identity information associated with the user of the first device 101 at the second communication resource, and whether the message, i.e., if steps 202-205 were executed by the first device 101, comprises location information. The location information is in addition to the information that the first device 101 is close. The information that the first device 101 is close is known by the second device 105 as a result of having received the message. Only devices which are nearby the first device 101 receive the message, and thereby knows that the first device 101 is close. The location information provides the second device 105 with the exact location of the first device 101. The second device 105 may or may not know its own location to be able to know the exact location of the first device 101.

The second device 105 may detect the location information through the bit in the second communications resource which is reserved for indicating whether location information is in the message or not.

If the second device 105 has detected that the message comprises location information, it finds the appropriate communications resource which carries the location information, i.e. it obtains information about the first communications resource with carries the location information in the message. The second device 105 does this by performing similar operations as the first device 101 did in step 203.

Step 209

In this example, the message is a non-public message which is encrypted. The second device 105 is capable for decrypting the encrypted message. In case the second device 105 is a device which is authorized to read the message, it comprises a decryption key. Once the second device 105 has detected that the message comprises location information, provided the location information was included in the message from the first device 101, and has found the first communication resource carrying the location information, it decrypts the location information using the decryption key. Together with the identity information also comprised in the message, the second device 105 is able to know that the first device 105 is nearby and also it's more detailed location.

Non-authorized receivers may also receive the message, but since they do not have the decryption key, they do not understand the location information.

In case the message is a public message, the second device 105 does not need to perform any decrypting to be able to read and understand the location information.

When the location information is decrypted, the second device 105 reads the location information of the first device 101.

Step 210

In the case when the location information was truncated by the first device 101, the second device 105 identifies the reference, e.g. GPS, the local coordinate system or the global coordinate system, with which the location information is associated. Based on the reference, the second device 105 detruncates the truncated location information. The detruncated location information thus comprises the full location coordinates according to the reference, e.g. 57.708611, 11.973056 using GPS as the reference coordinate system.

Figure 4:
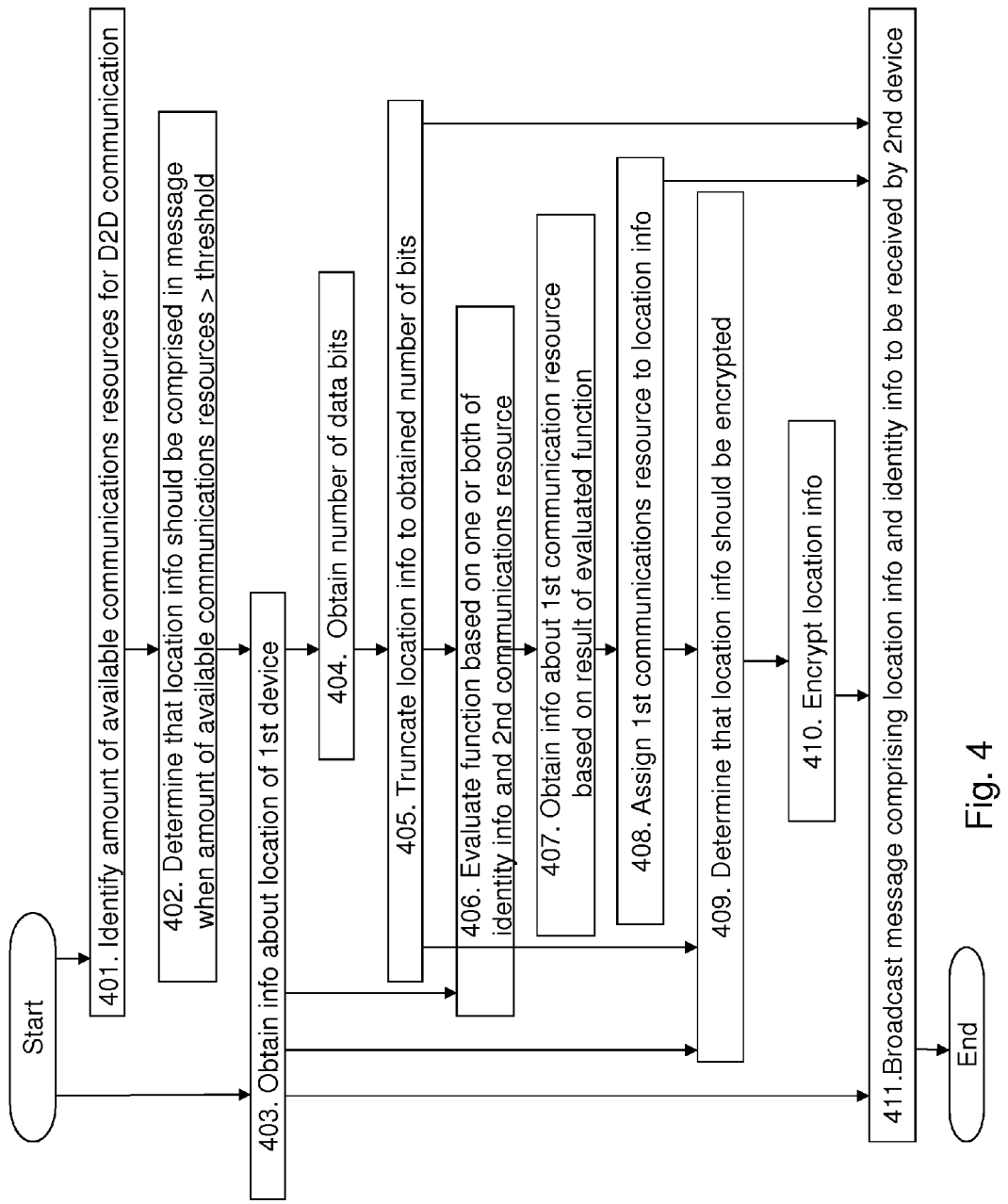
FIG. 4 is a flow chart illustrating embodiments of a method in a first device.

The method described above will now be described seen from the perspective of the first device 101. FIG. 4 is a flowchart describing the present method in the first device 101, for informing the second device 105 that the identity associated with the first device 101 is at a certain location. The method comprises the further steps to be performed by the first device 101, which steps may be taken in any suitable order:

Step 401

This step corresponds to step 201 in FIG. 2.

In some embodiments, the first device 101 identifies the amount of available communications resources for the broadcasting of the message.

The first device 101 may know that, e.g., only some time slots or similar resources should be used for broadcasting this type of messages. This knowledge may, e.g. be provided from a network to which the first device 101 is connected.

Step 402

This step corresponds to step 201 in FIG. 2, and is a step following step 401.

In some embodiments, the first device 101 determines that the location information should be comprised in the message together with the identity information only when the identified amount of available communications resources is above a threshold. E.g. if the threshold is 50% of the available communications resources, then the location information is comprised in the message only when more than 50% of the resources are available.

Step 403

This step corresponds to step 202 in FIG. 2.

The first device 101 obtains information about the location of the first device 101. The location is a geographical location, and may also be referred to as a position. The obtained location information is non-truncated, i.e. having full precision.

The obtained location information is associated with a reference known to the first device 101 and the second device 105.

In some embodiments, the reference is associated with a global positioning system, referred to as GPS, a local coordinate system or a global coordinate system.

Step 404

This step corresponds to step 204 in FIG. 2.

In some embodiments, the first device 101 obtains a number of data bits, e.g. 16 or 19 bits, based on a coverage distance of the broadcasting of the message and a predefined precision of the location information. The predefined precision may be for example 1 m or 10 m. The coverage distance may be for example an estimated value for at what maximum distance the D2D messages may be received, based, e.g., on device power levels, antenna gains, and propagation environment. Referring to step 204 where the dependency between the nrof bits and the grid spacing and the maximum range of the message. The nrof bits increases when the grid spacing and the maximum range increases. High precision is associated with large grid spacing. Grid spacing is the invers of location precision.

The number of data bits may be obtained via control signaling, or it may be predefined in the first device 101 by configuration, i.e. by signaling from the system.

In some embodiments, the number of bits may be predefined if the same precision is always desired. In some embodiments, the precision depends on the load of the system, or it depends on the environment. For example, in a rural area a precision of 20 m or so may be acceptable since it will be easier to find the location. In a city or an indoor location a finer precision may be desired. For example a cellular network may control the broadcasting of these messages and may adapt the precision, implicitly the number of data bits, or it may explicitly adapt the number of data bits directly, based on parameters such as mentioned above.

Step 405

This step corresponds to step 204 in FIG. 2, and is a step following step 404.

In some embodiments, the first device 101 truncates the location information to the obtained number of bits. An example of the number of bits is described in relation to step 204 above.

Step 406

This step corresponds to step 203 in FIG. 2.

In some embodiments, the first device 101 evaluates a function based on one or both of the identity information and the second communications resource.

The function may be a hash function. A modulo function may be used as an example. The modulo function finds the remainder of division of one number by another. If there are M possible communications resources which may be used for the location information, then the hash function may be "input modulo M" which returns a value which is one of 0, 1, 2, . . . , M−1, where each value points to a unique communications resource of the M communications resources.

Step 407

This step corresponds to step 203 in FIG. 2, and is a step following step 406.

In some embodiments, the first device 101 determines the first communication resource based on a result of the evaluated function. In other words, the first device 101 determines which spectrum resources will be used for carrying the location information. The result of the evaluated function may be directly associated with the first communications resource, as described in step 406.

Step 408

This step corresponds to step 203 in FIG. 2, and is a step following step 407.

In some embodiments, the first device 101 maps the location information to the determined first communications resource.

Step 409

This step corresponds to step 205 in FIG. 2.

In some embodiments, the first device 101 determines that the location information should be encrypted such that it may be decrypted by the second device 105 only if the second device 105 is authorized to read the location information. In other words, the first device 101 determines that only authorized receivers of the message should be able to understand the message.

Step 410

This step corresponds to step 205 in FIG. 2, and is a step following step 409.

In some embodiments, the first device 101 encrypts the location information by using the encryption key. The encryption key is predefined in the first device 101.

Step 411

This step corresponds to step 206 in FIG. 2.

The first device 101 broadcasts, by means of D2D communication, the message to be received by the second device 105. The message comprises the location information and the identity information associated with the user of the first device 101. The location information is transmitted on the first communications resource and the identity information is transmitted on the second communications resource, and thus the second device 105 is informed that an identity associated with the first device 101 is at a certain location.

The identify information may be the parameter identity_value as described above. In this case, the identity_value is a number which has a meaning to the second device 105 receiving the message. In the second device 105 which receives the message there is a mapping from the identity value to a certain meaning e.g. in an application e.g. Facebook. An identity may depend on a certain user or owner of the user equipment, a place, an application, etc. For example, the identity may be tied to a certain group of users on a social media application, such as Facebook, and then identifies a particular user to other members of this user group.

The broadcasting is typically performed at regular intervals.

In some embodiments, the location information comprised in the message is the truncated location information.

In some embodiments, the location information comprised in the message is the encrypted location information.

In some embodiments, the first communications resource and the second communications resource is the same communications resource.

In some embodiments, the second communications resource comprises an indication indicating that the message comprises the location information. The indication may be a bit where a 1 indicates that the message comprises the location information, and a 0 indicates that the message does not comprise the location information.

Figure 5:
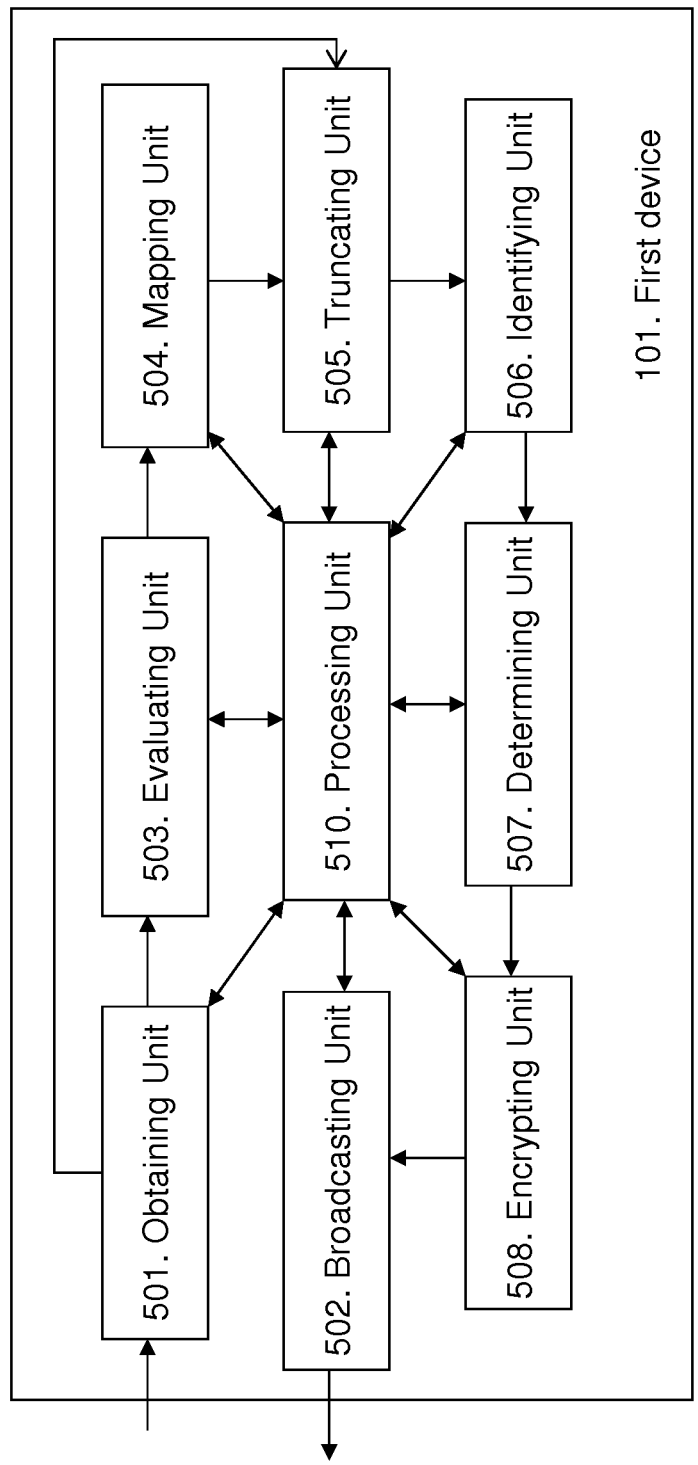
FIG. 5 is a block diagram illustrating embodiments of a first device.

To perform the method steps shown in FIG. 4 for informing the second device 105 that an identity associated with the first device 101 is at a certain location the first device 101 comprises an arrangement as shown in FIG. 5.

The first device 101 comprises an obtaining unit 501 which is configured to obtain information about the location of the first device 101. In some embodiments, the obtaining unit 501 is further configured to obtain the number of data bits based on the coverage distance of the message and the predefined precision of the location information. In some embodiments, the obtained location information is associated with the reference predefined in the first device 101 and second device 105. In some embodiments, the reference is associated with the global positioning system, referred to as GPS, the local coordinate system or the global coordinate system. In the example where the reference is associated with GPS, the obtaining unit 501 is a GPS receiver.

The first device 101 comprises a broadcasting unit 502 which is configured to broadcast by means of D2D communication, the message to be received by the second device 105. The message comprises the location information and the identity information associated with the user of the first device 101. The location information is transmitted on the first communications resource and the user identity is transmitted on the second communications resource. In some embodiments, the second communications resource comprises the indication indicating that the message comprises the location information. In some embodiments, the first communications resource and the second communications resource is the same communications resource. In some embodiments, the location information comprised in the message is the truncated location information. In some embodiments, the location information comprised in the message is the encrypted location information.

In some embodiments, the first device 101 comprises an evaluating unit 503 configured to evaluate the function based on one or both of the identity information and the second communications resource.

In some embodiments, the first device 101 comprises a mapping unit 504 configured to map the location information to the determined first communications resource.

In some embodiments, the first device 101 comprises a truncating unit 505 configured to truncate the location information to the obtained number of bits. In some embodiments, the number of data bits is predefined in the first device 101.

In some embodiments, the first device 101 comprises an identifying unit 506 which is configured to identify the amount of available communications resources for the broadcasting of the message, In some embodiments, the first device 101 comprises a determining unit 507 which is configured to determine the first communication resource based on the result of the evaluated function. In some embodiments, the determining unit 507 is configured to determine that the location information should be comprised in the message only when the amount of available communications resources is above the threshold. In some embodiments, the determining unit 507 is configured to determine that the location information should be encrypted such that it may be decrypted by the second device 105.

In some embodiments, the first device 101 comprises an encrypting unit 508 configured to encrypt the location information by using the encryption key known to the first device 101.

Figure 6:
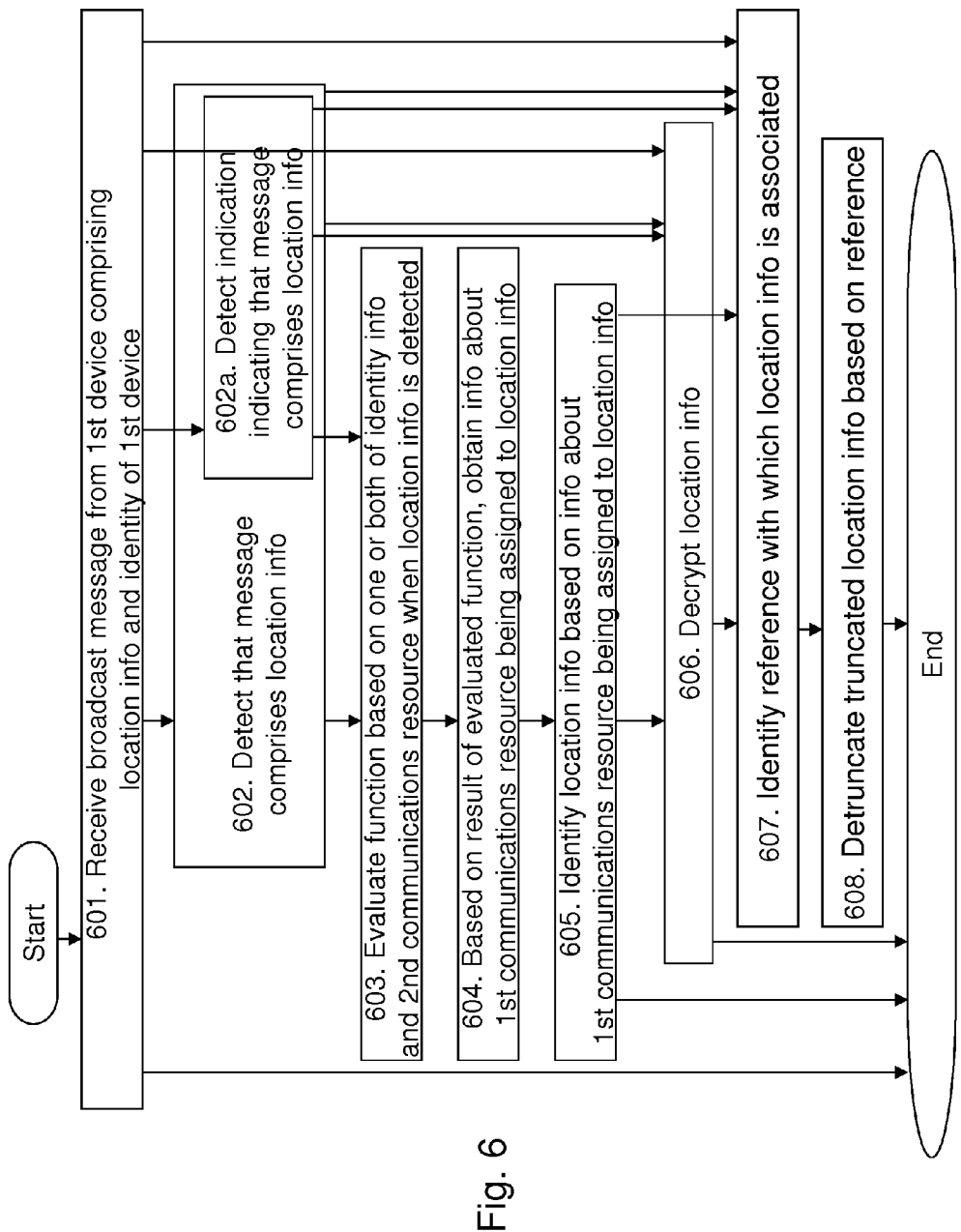
FIG. 6 is a flow chart illustrating embodiments of a method in a second device.

The method described above will now be described seen from the perspective of the second device 105. FIG. 6 is a flowchart describing the present method in the second device 105 for being informed by the first device 101 that the identity associated with the first device 101 is at a certain location. The method comprises the further steps to be performed by the second device 105 which steps may be taken in any suitable order:

Step 601

This step corresponds to step 207 in FIG. 2.

The second device 105 receives, by means of D2D communication, the message broadcast from the first device 101. The message comprises the location information and the identity information associated with the user of the first device 101. The location information is received on the first communications resource and the identity information is received on the second communications resource.

In some embodiments, the location information comprised in the message is truncated based on coverage distance of the broadcasting of the message and the predefined precision of the location information.

In some embodiments, the location information is associated with the reference predefined in the second device 105 and the first device 101. In some embodiments, the reference is associated with the global positioning system, referred to as GPS, the local coordinate system or the global coordinate system.

In some embodiments, the first communications resource and the second communications resource is the same communications resource.

Step 602

This step corresponds to step 208 in FIG. 2.

In some embodiments, the second device 105 detects that the message comprises the location information. In other words, the second device 105 is able to identify the cases for which it should look for location information.

Step 602a

This is a substep of step 602.

In some embodiments, the second device 105 detects an indication indicating that the message comprises the location information. The indication is comprised in the second communications resource. The indication may be a bit which is reserved in the second communications resource for indicating whether location information is comprised or not.

Step 603

This step corresponds to step 208 in FIG. 2, and a step which follows step 602 or 602a.

In some embodiments, the second device 105 evaluates the function based on one or both of the identity information and the second communications resource when the location information is detected.

Step 604

This step corresponds to step 208 in FIG. 2, and a step which follows step 603.

In some embodiments, the second device 105 determines the first communications resource based on the result of the evaluated function. In other words, if the second device 105 has detected that the message comprises location information, it finds the appropriate communications resource which carries the location information, i.e. it obtains information about the first communications resource with carries the location information in the message. The second device 105 does this by performing similar operations as the first device 101 did in step 203.

Step 605

This step corresponds to step 208 in FIG. 2, and a step which follows step 604.

In some embodiments the second device 105 identifies that the location information is mapped to the determined first communications resource Step 606

This step corresponds to step 209 in FIG. 2.

In some embodiments, the second device 105 decrypts the location information using the decryption key associated with the encryption key. The location information in the message may be encrypted by the first device 101 using the encryption key.

Step 607

This step corresponds to step 210 in FIG. 2.

In some embodiments, the second device 105 identifies the reference, e.g. GPS, the local coordinate system or the global coordinate system, with which the location information is associated.

Step 608

This step corresponds to step 210 in FIG. 2 and is performed after step 607.

In some embodiments, the second device 105 detruncates the truncated location information based on the identified reference. The detruncated location information thus comprises the full location coordinates according to the reference.

Figure 7:
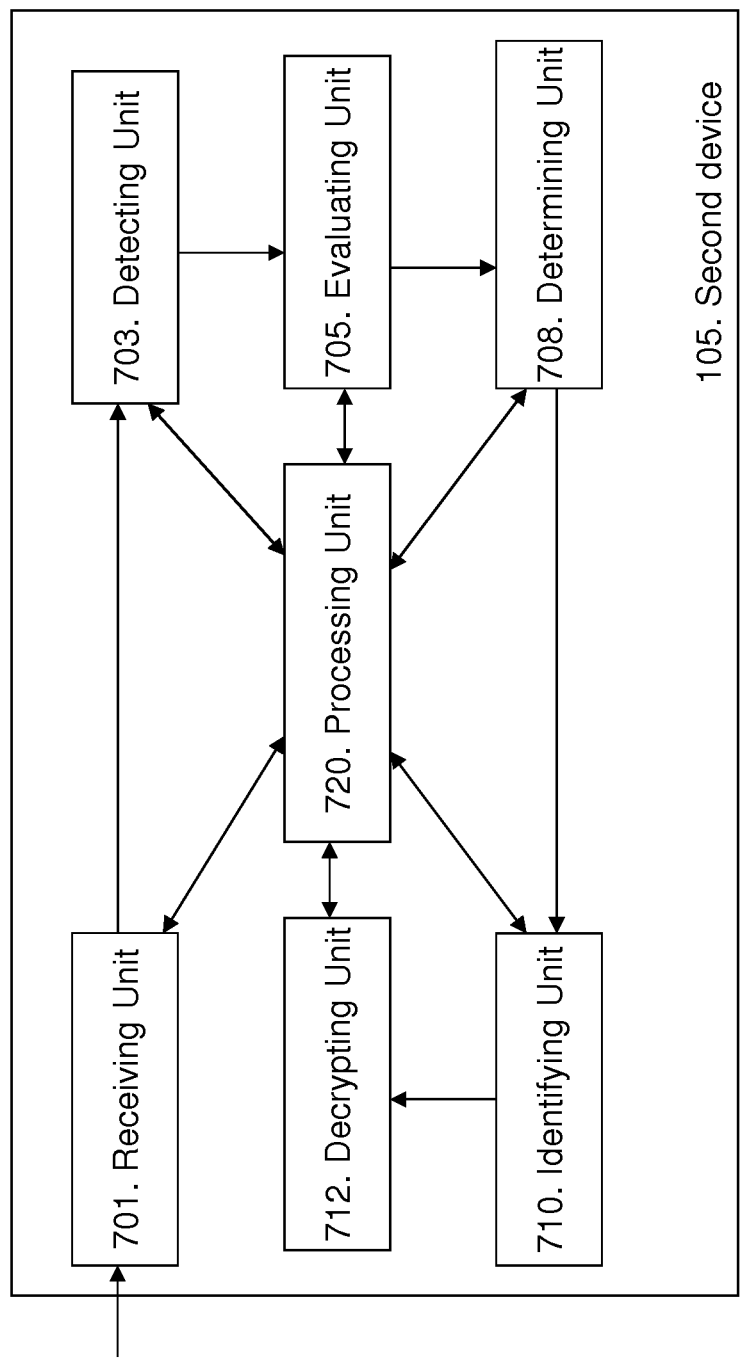
FIG. 7 is a block diagram illustrating embodiments of a second device.

To perform the method steps shown in FIG. 6 for being informed by a first device 101 that the identity associated with the first device 101 is at a certain location the second device 105 comprises an arrangement as shown in FIG. 7.

The second device 105 comprises a receiving unit 701 which is configured to receive the message broadcast, by means of D2D communication, from the first device 101. The message comprises location information and the identity information associated with the user of the first device 101. The location information is received on the first communications resource and the user identity is received on the second communications resource. In some embodiments, the location information comprised in the message is truncated based on coverage distance of the broadcasting of the message and a predefined precision of the location information. In some embodiments, the location information is associated with the reference predefined in the second device 105 and the first device 101. In some embodiments, the reference is associated with the global positioning system, referred to as GPS, the local coordinate system or the global coordinate system. In some embodiments, the first communications resource and the second communications resource is the same communications resource.

In some embodiments, the second device 105 comprises a detecting unit 703 which is configured to detect that the message comprises the location information. In some embodiments, the detecting unit 703 is further configured to detect the indication indicating that the message comprises the location information. The indication is comprised in the second communications resource.

In some embodiments, the second device 105 further comprises an evaluating unit 705 configured to evaluate the function based on one or both of the identity information and the second communications resource.

In some embodiments, the second device 105 further comprises a determining unit 708 configured to determine the first communications resource based on the result of the evaluated function.

In some embodiments, the second device 105 further comprises an identifying unit 710 configured to identify that the location information is mapped to the determined first communications resource. In some embodiments, the identifying unit 710 is further configured to identify the reference with which the location information is associated.

In some embodiments, the location information in the message is encrypted by the first device 101 using the encryption key known to the first device 101, and the second device 105 further comprises a decrypting unit 712 which is configured to decrypt the location information using the decryption key associated with the encryption key.

In some embodiments, the second device 105 further comprises a processing unit 720 configured to detruncate the truncated location information based on the identified reference.

The present mechanism for informing a second device 105 that the identity associated with the first device 101 is at a certain location may be implemented through one or more processors, such as a processing unit 510 in the first device 101 depicted in FIG. 5 and the processing unit 720 in the second device 105 depicted in FIG. 7, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the first device 101 and/or second device 105. One such carrier may be in the form of a CD ROM disc. It is however feasible with other data carriers such as a memory stick. The computer program code may furthermore be provided as pure program code on a server and downloaded to the first device 101 and/or second device 105 remotely.

Figure 8:
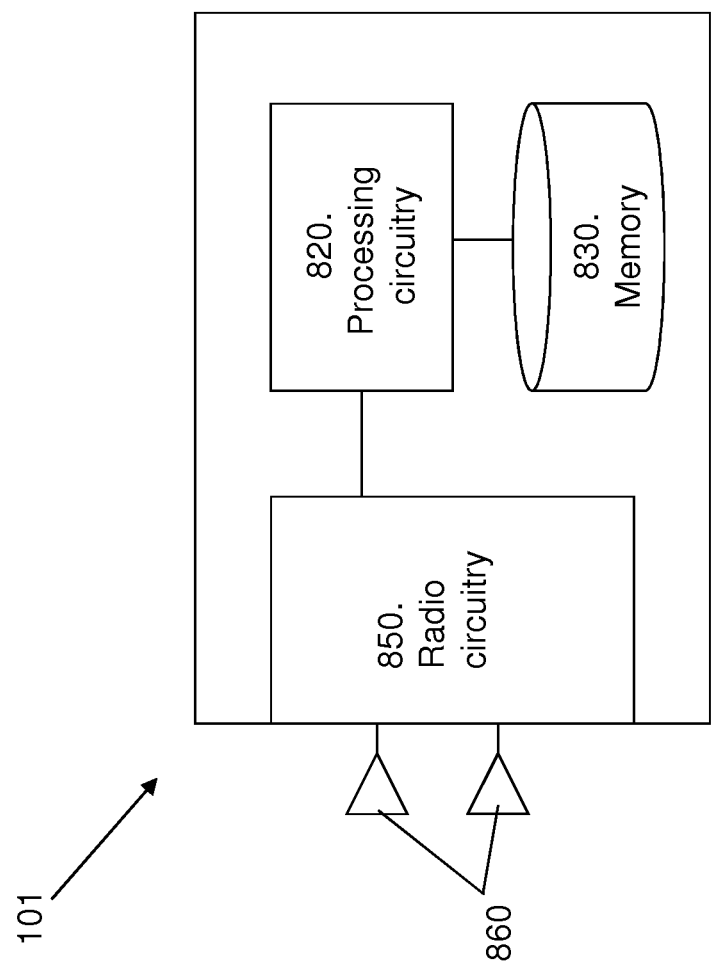
FIG. 8 is a block diagram illustrating embodiments of a first device.

Some example implementations of the embodiments illustrated above will now be described. The example system may further include any additional elements suitable to support communication between the first device 101 and the second device 105. Although the illustrated first device 101 may represent a device that include any suitable combination of hardware and/or software, this first device 101 may, in particular embodiments, represent a device such as the example first device 101 illustrated in greater detail by FIG. 8. As shown in FIG. 8, the example first device 101 comprises processing circuitry 810, a memory 830, radio circuitry 850, and at least one antenna 860. The radio circuitry 850 may comprise Radio Frequency (RF) circuitry and baseband processing circuitry (not shown). In particular embodiments, some or all of the functionality described above may be provided by the processing circuitry 820 executing instructions stored on a computer-readable medium, such as the memory 830 shown in FIG. 8. The processing circuitry 820 illustrated in FIG. 8 corresponds to the processing unit 510 illustrated in FIG. 5. Alternative embodiments of the first device 101 may comprise additional components beyond those shown in FIG. 8 that may be responsible for providing certain aspects of the first device's 101 functionality, comprising any of the functionality described above and/or any functionality necessary to support the embodiments described above.

As shown in FIG. 9, the example second device 105 comprises processing circuitry 920, a memory 930, radio circuitry 950, and at least one antenna 960. The processing circuitry 920 may comprise RF circuitry and baseband processing circuitry (not shown). In particular embodiments, some or all of the functionality described above may be provided by the processing circuitry 920 executing instructions stored on a computer-readable medium, such as the memory 930 shown in FIG. 9. The processing circuitry 920 illustrated in FIG. 9 corresponds to the processing unit 720 illustrated in FIG. 7 and the antenna 960 illustrated in FIG. 9 corresponds to the receiving unit 701 illustrated in FIG. 7. Alternative embodiments of the second device 105 may comprise additional components responsible for providing additional functionality, including any of the functionality identified above and/or any functionality necessary to support the embodiments described above.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method in a first device for informing a second device that an identity associated with the first device is at a certain location, the method comprising:
   obtaining information about the location of the first device;

determining a second communications resource using a hash function, wherein the hash function has as input an identifier of a first communications resource; and broadcasting, via a device to device (D2D) communication, a message to be received by the second device, wherein the message includes the location information and identity information that identifies a user of the first device, and wherein the identity information is transmitted on the first communications resource and the location information is transmitted on the second communications resource.

2. The method of claim 1, further comprising:

obtaining a number of data bits based on a coverage distance of the broadcasting of the message and based on a predefined precision of the location information; and truncating the location information to the obtained number of bits by discarding one or more most significant bits of the location information until the truncated location information has the obtained number of bits; and wherein the location information comprised in the message is the truncated location information.

3. The method of claim 2, wherein the number of data bits is predefined in the first device.

4. The method of claim 1, wherein the obtained location information is associated with a reference known to the first device and the second device.

5. The method of claim 4, wherein the reference is associated with a global positioning system, referred to as GPS, a local coordinate system or a global coordinate system.

6. The method of claim 1, further comprising:

identifying an amount of available communications resources for the broadcasting of the message; and determining that the location information should be included in the message only when the identified amount of available communications resources is above a threshold.

7. The method of claim 1, further comprising:

determining that the location information should be encrypted such that it can be decrypted by the second device;

encrypting the location information by using an encryption key known to the first device; and wherein the location information included in the message is the encrypted location information.

8. The method of claim 1, wherein the first communications resource comprises an indication indicating that the message includes the location information.

9. The method of claim 1, wherein the first communications resource and the second communications resource are the same communications resource.

10. The method of claim 1, wherein the first communications resource and the second communications resource are different communications resources.

11. The method of claim 1, wherein the hash function is a hash function of both the identity information and the first communications resource.

12. The method of claim 11, wherein the first communications resource used to determine the second communications resource corresponds to at least one of an area in a time-frequency grid, a code, and a time slot of spectrum used by the first communication resource.

13. A method in a second device for being informed by a first device that an identity associated with the first device is at a certain location, the method comprising:

receiving, via a device to device (D2D) communication, a first portion of a message broadcast from the first device, wherein the first portion of the message includes identity information that identifies a user of the first device, wherein the identity information is received on a first communications resource;

determining the second communications resource using a hash function, wherein the hash function has as input an identifier of the first communications resource;

identifying that the location information is mapped to the determined second communications resource; and receiving, via a device to device (D2D) communication, a second portion of the message broadcast from the first device, wherein the second portion of the message includes information about the location of the first device, wherein the location information is received on the second communications resource.

14. The method of claim 13, further comprising detecting that the message includes the location information.

15. The method of claim 14, wherein the detecting that the message includes the location information further comprises:

detecting an indication indicating that the message includes the location information, wherein the indication is comprised in the first communications resource.

16. The method of claim 13, wherein the location information in the message is encrypted by the first device using an encryption key known to the first device, and wherein the method further comprises decrypting the location information using a decryption key associated with the encryption key.

17. The method of claim 13, wherein the location information included in the message is truncated based on a coverage distance of the broadcasting of the message and a predefined precision of the location information, said truncated location information having most significant bits of original location information omitted.

18. The method of claim 13, wherein the location information is associated with a reference predefined in the second device and the first device.

19. The method of claim 18, wherein the reference is associated with a global positioning system, referred to as GPS, a local coordinate system or a global coordinate system.

20. The method of claim 18, further comprising:

identifying the reference with which the location information is associated; and detruncating the truncated location information, based on the identified reference, by adding most significant bits to the truncated location information.

21. The method of claim 13, wherein the first communications resource and the second communications resource are the same communications resource.

22. The method of claim 13, wherein the hash function is a hash function of both the identity information and the first communications resource.

23. A first device for informing a second device that an identity associated with the first device is at a certain location, the first device comprising:

an obtaining unit configured to obtain information about the location of the first device;

a determining unit configured to determine a second communications resource using a hash function, wherein the hash function has as input an identifier of a first communications resource; and a broadcasting unit configured to broadcast via a device to device (D2D) communication, a message to be received by the second device, wherein the message includes the location information and identity information that identifies a user of the first device, and wherein the identity information is transmitted on the first communications resource and the location information is transmitted on the second communications resource.

24. The first device of claim 23, wherein the obtaining unit is further configured to obtain a number of data bits based on a coverage distance of the message and a predefined precision of the location information; and wherein the first device further comprises:

a truncating unit configured to truncate the location information to the obtained number of bits by discarding one or more most significant bits of the location information until the truncated location information has the obtained number of bits; and wherein the location information included in the message is the truncated location information.

25. The first device of claim 24, wherein the number of data bits is predefined in the first device.

26. The first device of claim 23, wherein the obtained location information is associated with a reference predefined in the first device and second device.

27. The first device of claim 26, wherein the reference is associated with a global positioning system, referred to as GPS, a local coordinate system or a global coordinate system.

28. The first device of claim 23, further comprising:

an identifying unit configured to identify an amount of available communications resources for the broadcasting of the message; and a determining unit configured to determine that the location information should be included in the message only when the amount of available communications resources is above a threshold.

29. The first device of claim 23, further comprising:

a determining unit configured to determine that the location information should be encrypted such that it can be decrypted by the second device; and an encrypting unit configured to encrypt the location information by using an encryption key known to the first device; and wherein the location information included in the message is the encrypted location information.

30. The first device of claim 23, wherein the first communications resource comprises an indication indicating that the message includes the location information.

31. The first device of claim 23, wherein the first communications resource and the second communications resource are the same communications resource.

32. The first device of claim 23, wherein the hash function is a hash function of both the identity information and the first communications resource.

33. A second device for being informed by a first device that an identity associated with the first device is at a certain location, the second device comprising:

a receiving unit configured to receive a message broadcast via a device to device (D2D) communication, from the first device, wherein the message includes information about the location of the first device and identity information that identifies a user of the first device, wherein the identity information is received on a first communications resource and the location information is received on a second communications resource;

a determining unit configured to determine the second communications using a hash function, wherein the hash function has as input an identifier of the first communications resource; and an identifying unit configured to identify that the location information is mapped to the determined second communications resource.

34. The second device of claim 33, further comprising:

a detecting unit configured to detect that the message includes the location information.

35. The second device of claim 34, wherein the detecting unit is further configured to detect an indication indicating that the message includes the location information, wherein the indication is comprised in the first communications resource.

36. The second device of claim 33, wherein the location information in the message is encrypted by the first device using an encryption key known to the first device, and wherein the second device further comprises:

a decrypting unit configured to decrypt the location information using a decryption key associated with the encryption key.

37. The second device of claim 33, wherein the location information comprised in the message is truncated based on coverage distance of the broadcasting of the message and a desired precision of the location information, said truncated location information having most significant bits of original location information omitted.

38. The second device of claim 33, wherein the location information is associated with a reference predefined in the second device and the first device.

39. The second device of claim 38, wherein the reference is associated with a global positioning system, referred to as GPS, a local coordinate system or a global coordinate system.

40. The second device of claim 38, further comprising:

an identifying unit configured to identify the reference with which the location information is associated; and a processing unit configured to detruncate the truncated location information, based on the identified reference, by adding most significant bits to the truncated location information.

41. The second device of claim 33, wherein the first communications resource and the second communications resource are the same communications resource.

42. The first device of claim 33, wherein the hash function is a hash function of both the identity information and the first communications resource.

* * * * *